United States Patent
Bringans et al.

(10) Patent No.: US 7,155,129 B2
(45) Date of Patent: Dec. 26, 2006

(54) STEERABLE FREE SPACE OPTICAL INTERCONNECT APPARATUS

(75) Inventors: Ross D. Bringans, Cupertino, CA (US); Eric Peeters, Fremont, CA (US)

(73) Assignee: Xerox Corporation, Stamford, CT (US)

( * ) Notice: Subject to any disclaimer, the term of this patent is extended or adjusted under 35 U.S.C. 154(b) by 615 days.

(21) Appl. No.: 10/041,545

(22) Filed: Jan. 7, 2002

(65) Prior Publication Data

US 2004/0208596 A1 Oct. 21, 2004

(51) Int. Cl.
*H04B 10/00* (2006.01)
*G02B 7/02* (2006.01)

(52) U.S. Cl. .................... 398/131; 398/127; 398/129; 359/814

(58) Field of Classification Search ............. 398/119, 398/128, 129, 130, 131, 127; 385/33; 359/622, 359/814
See application file for complete search history.

(56) References Cited

U.S. PATENT DOCUMENTS

| | | | | |
|---|---|---|---|---|
| 5,463,498 | A * | 10/1995 | Gal et al. | 359/622 |
| 5,923,480 | A * | 7/1999 | Labeye | 359/814 |
| 6,054,335 | A | 4/2000 | Sun et al. | |
| 6,091,537 | A | 7/2000 | Sun et al. | |
| 6,116,756 | A | 9/2000 | Peeters et al. | |
| 6,320,998 | B1 * | 11/2001 | Okayama et al. | 385/22 |
| 6,323,980 | B1 * | 11/2001 | Bloom | 398/129 |
| 6,415,068 | B1 * | 7/2002 | Sun | 385/16 |
| 6,445,514 | B1 * | 9/2002 | Ohnstein et al. | 359/813 |
| 6,509,992 | B1 * | 1/2003 | Goodwill | 398/131 |
| 6,549,703 | B1 * | 4/2003 | Tanielian et al. | 385/33 |
| 2002/0071160 | A1 * | 6/2002 | Pavelchek | 359/152 |

* cited by examiner

*Primary Examiner*—Jason Chan
*Assistant Examiner*—Nathan Curs
(74) *Attorney, Agent, or Firm*—Bever, Hoffman & Harms, LLP; Patrick T. Bever

(57) ABSTRACT

A microlens assembly is automatically aligned (positioned) to facilitate optimal light beam transmission between two spaced-apart subsystems (e.g., two printed circuit boards) supported within a larger system (e.g., a server system). The microlens assembly is controlled by the first subsystem, which also includes a light source (e.g., an emitter array) that generates the light beams by converting data signals. The second subsystem is provided with a receiver capable of receiving the light beams from the light source. The microlens assembly manipulates the microlens according to a raster light beams over a wide area surrounding the second subsystem. The optimal position of the microlens is determined by measuring a strength of each light signal, and by identifying an optimal strength light signal. The microlens assembly is then locked into the position associated with the optimal light signal.

17 Claims, 5 Drawing Sheets

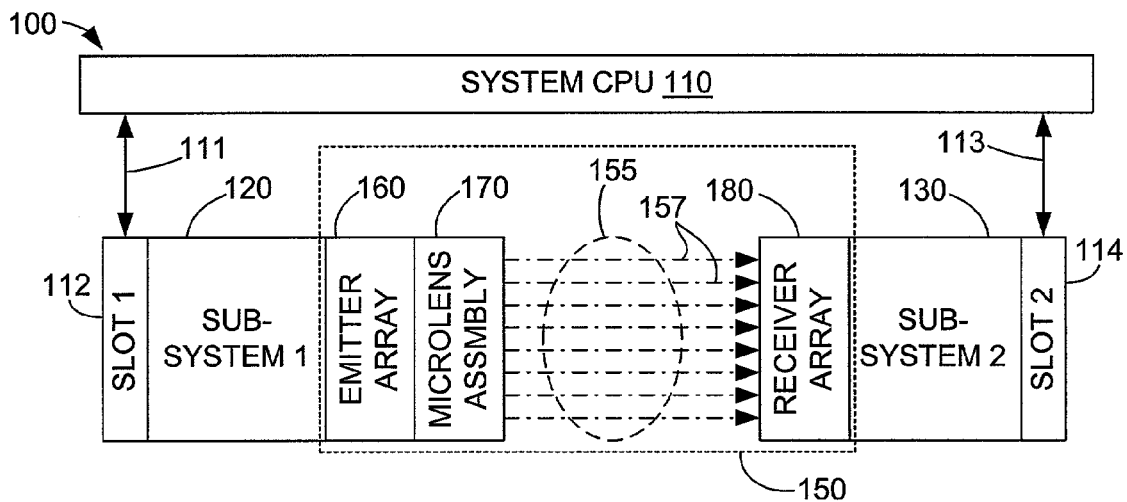
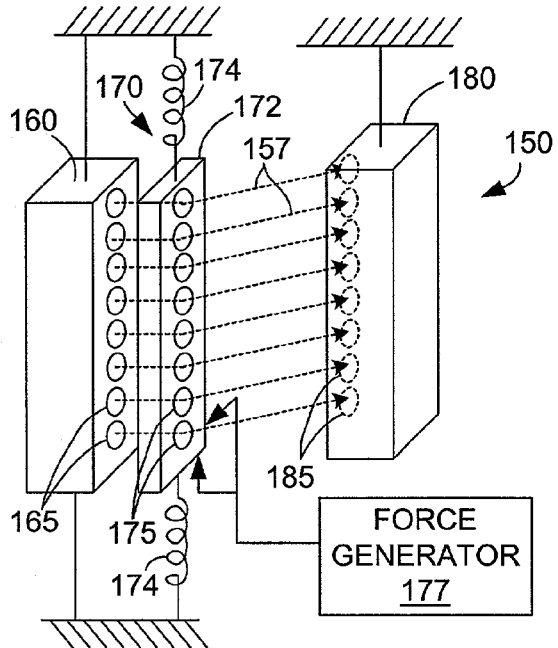
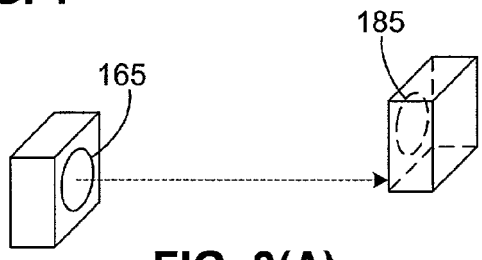
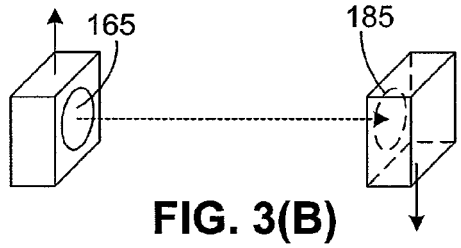
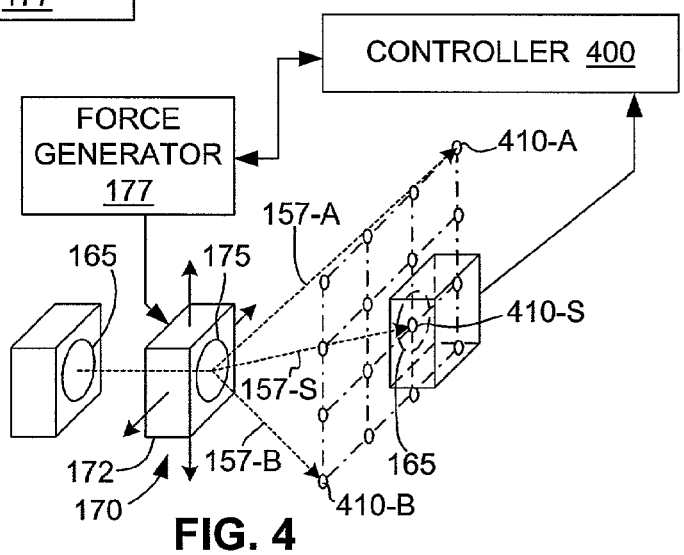

STEERABLE FREE SPACE OPTICAL INTERCONNECT APPARATUS

FIELD OF THE INVENTION

This invention relates to optical data transmissions, and more particularly to the transmission of data across a free space using light beam signals.

BACKGROUND OF THE INVENTION

Optical fiber has been established as the transmission medium of choice for telecommunications because it supports very high bandwidth over long distances and provides transmission speed capabilities that far exceed those of conventional copper-wire technology. Research is now looking at other possible applications for optical interconnect technology.

In one such application, free space optical interconnects are being researched as promising high speed communication platforms for the next generation of server systems, and may be used in smaller workstations and computer-to-computer parallel data-communication links in local area networks. For example, when utilized in server systems, free space optical interconnects will be utilized to support direct board-to-board communications within the server housing.

One of the key issues with free-space optical interconnects is that the boards that are to be interconnected are not rigidly coupled, and that their relative positions are likely to be time varying. Some server manufacturers require the ability to hot-swap boards in-situ without the use of any special alignment tools. Therefore, the successful implementation of free-space optical interconnects requires addressing this alignment issue.

A second potential application of free space optical interconnects involves optical data switching, which takes an output from one or more optical fibers and translates that light to other optical elements (e.g., MEMS mirrors, arrayed waveguides, and filter arrays). Again, the successful implementation of free-space optical interconnects in this application requires reliable alignment between the source and target elements.

What is needed is a free space optical interconnect system that automatically positions the emitters and/or detectors at power up, and monitors and adjusts the positions during operation.

SUMMARY OF THE INVENTION

The present invention is directed to a free space optical interconnect system in which a microlens assembly is automatically aligned (positioned) to facilitate optimal light beam transmission between two spaced-apart subsystems (e.g., two printed circuit boards) supported within a larger system (e.g., a server system). The microlens assembly is controlled by the first subsystem, which also includes a light source (e.g., an emitter array) that generates the light beams by converting data signals. The second subsystem is provided with a receiver capable of receiving the light beams from the light source. In one embodiment, the first and second subsystems are mounted in locations (slots) such that rough positioning is provided between the light source and the receiver array. The microlens assembly then manipulates the microlens according to a predefined series of positions relative to the light source, thereby producing a series of light beams that are directed toward a wide area surrounding the second subsystem. The optimal position of the microlens is determined by measuring a strength of each light signal, and by identifying the strongest light signal. The microlens assembly is then locked into the position associated with the strongest light signal, and normal communication is commenced. This alignment process is repeated as often as needed to maintain optimal communication between the first and second subsystems.

In accordance with an embodiment of the present invention, the microlens assembly includes a microlens support that holds at least one microlens, suspension members connected between the microlens support and a fixed base such that the microlens is movably suspended over the light source, and at least one force generator for moving the microlens support relative to the light source. The force generator receives position signals from a controller, and moves the microlens support into a position defined by the position signals. Movement of the microlens support by the force generator causes the microlens to direct the light signals generated by the light source in a direction determined by the position of the microlens relative to the emitter.

In accordance with another embodiment, a method for automatically aligning the light source (emitter) and a target (receiver) across a free space separating the emitter and receiver involves moving a microlens through a predefined series of positions relative to the emitter and generating a light beam at each position such that the resulting series of light signals are transmitted over a wide area surrounding the receiver. The optimal microlens position is determined measuring the strength of each light signal, and by identifying the light signal generating the strongest measurement. The position of the microlens associated with the strongest measured light signal is recorded, and is used to lock the microlens into the optimal position when the microlens has been moved through the entire series of positions.

BRIEF DESCRIPTION OF THE DRAWINGS

These and other features, aspects and advantages of the present invention will become better understood with regard to the following description, appended claims, and accompanying drawings, where:

FIG. 1 is a simplified block diagram showing a system including the free space optimal communication apparatus of the present invention;

FIG. 2 is perspective view showing a simplified version of the communication apparatus used in the system of FIG. 1;

FIGS. 3(A) and 3(B) are perspective views depicting the optimal alignment and misalignment, respectively, of an emitter and detector of a communication apparatus;

FIG. 4 is a perspective view depicting a method of moving a microlens assembly to determine the optimal alignment of the emitter and detector;

DETAILED DESCRIPTION OF THE DRAWINGS

Figure 5:
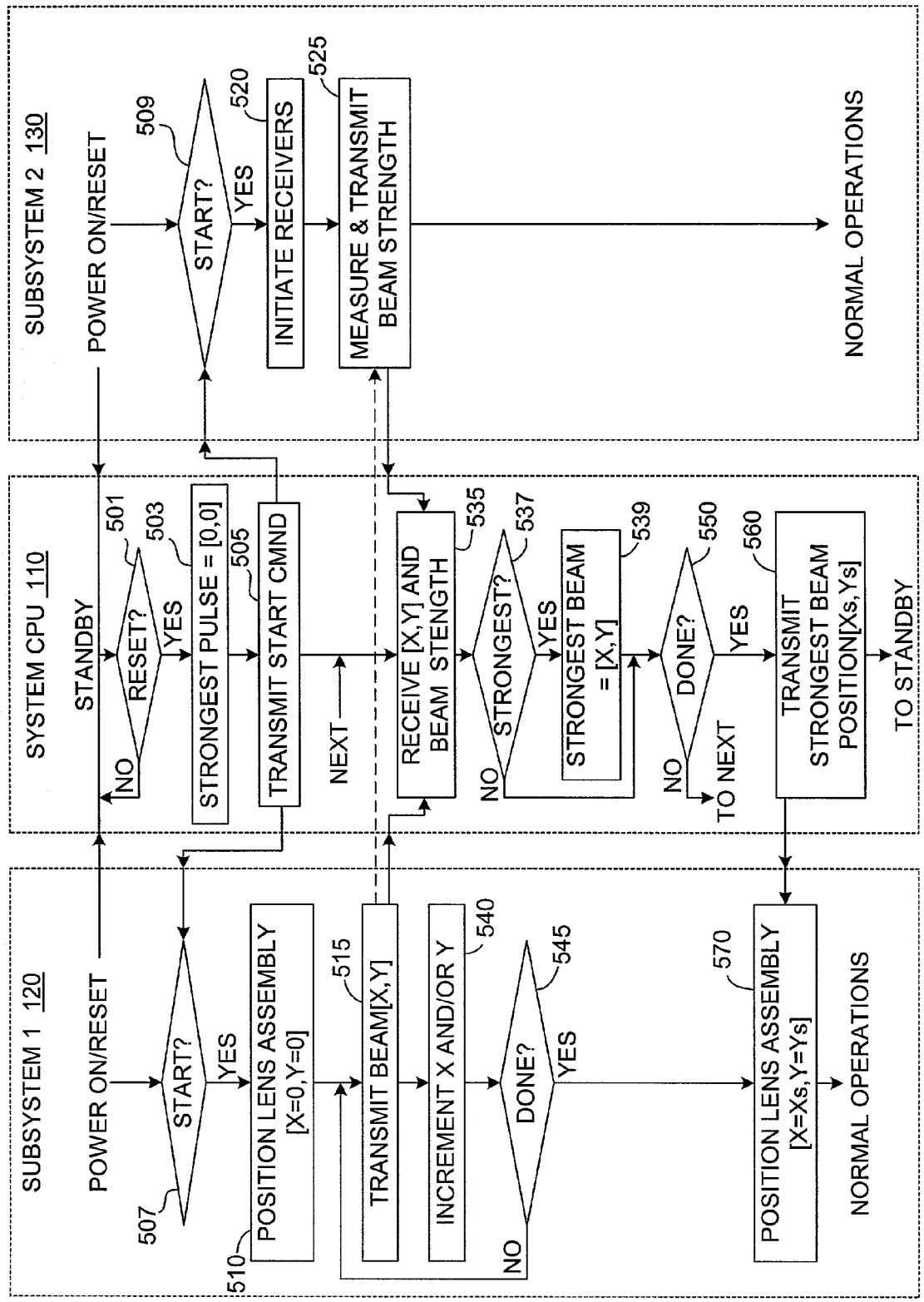
FIG. 5 is a flow diagram showing a method for automatically aligning the emitter and detector according to an embodiment of the present invention.

The present invention is directed to a free space optical communication (interconnect) apparatus for high-speed communication between two or more subsystems (e.g., two printed circuit boards) within a larger system (e.g., a server system). In particular, the apparatus of the present invention is used to automatically align one or more light sources associated with one subsystem with detectors associated with the second subsystem. The invention is described below with reference to a server system including a central processing unit (system CPU) that coordinates relatively low speed electronic ("hard wired") communications used during the automatic alignment process. However, the specific exemplary embodiment is not intended to be limiting, and the functions of the system CPU may be performed by one or both subsystems.

As used herein, the term "free space" refers to a region separating a light source (e.g., an emitter) and a light detector that is at least partially made up of a light transmitting non-solid medium (e.g., vacuum, air, or other gas) such that there is physical separation between the light source and the light detector. The "free space" may include one or more light modifying elements, such as lenses, mirrors, and light filters, that can be used to change the intensity, phase, spectral distribution, and/or direction of a light beam passing between the light source and light detector. Note that "free space" is distinguished from light transmission structures, such as fiber optic elements, that provide a physically, signal transmitting link between two subsystems.

FIG. 1 is a block diagram showing a server system 100 including a system CPU 110 that is electrically connected by first conductors 111 to a first connector slot 112, and by second conductors 113 to a to a second connector slot 114. A first subsystem 120 (e.g., formed on a printed circuit board) is mounted in connector slot 112 according to known techniques such that communication is provided between first subsystem 120 and system CPU 110 via first conductors 111. Similarly, a second subsystem 130 is mounted in connector slot 114 such that communication is provided via second conductors 113.

According to one aspect of the present invention, a free space optical communication apparatus 150 is provided for facilitating optical communication between first subsystem 120 and second subsystem 130 over a free space 155 located therebetween. In the disclosed embodiment, free space optical communication apparatus 150 generally includes an emitter array (light source) 160 and a microlens assembly 170 that are connected to first subsystem 120, and a receiver (light detector) array 180 that is connected to second subsystem 130. Emitter array 160 generates light signals (light beams) 157 that are steered (directed) by microlens 170 to receiver array 180. Light signals 157 are generated by emitter array 160 in response to electronic data signals transmitted from first subsystem 120. The light signals 157 are received (detected) by receiver array 180 and converted back into electronic data signals that are passed to second subsystem 130. Accordingly, data is transmitted from first subsystem 120 to second subsystem 130 using free space optical communication apparatus 150.

Although not shown or described below, second subsystem 130 typically includes an emitter array and microlens assembly similar to that provided on first subsystem 120, and first subsystem 120 includes a receiver array that is similar to that provided on second subsystem 130, thereby facilitating two-way communication between the subsystems. These additional optical interconnect elements operate essentially as described herein, and description thereof is therefore omitted for brevity.

According to another aspect of the present invention, a method is provided whereby free space optical communication apparatus 150 is automatically aligned to facilitate optimal light transmission between emitter array 120 and receiver array 180. In one embodiment, slots 112 and 114 are arranged such that connection of first subsystem 120 and second subsystem 130, respectively, provides a rough alignment between emitter array 160 and receiver array 180 (i.e., light beams generated by emitter array 160 are generally directed toward receiver array 180). The automatic alignment process, which is described below, is then performed to optimize the transmission of data between emitter array 160 and receiver array 180.

FIG. 2 is a simplified diagram illustrating free space optical communication apparatus 150 in additional detail. Emitter array 160 is fixedly connected to a base structure and includes several emitters 165 (e.g., VCSEL emitters) arranged in a line. Microlens assembly 170 includes a microlens support 172 that is movably connected by at least one suspension member 174 to the base structure. A series of microlenses 175 are mounted on microlens support 172 such that each microlens 175 is positioned in front of a corresponding emitter 165. Microlens support 172 is biased into a neutral position relative to emitter array 160 by suspension members 174 (e.g., springs). In the neutral position, light beams 157 generated by emitters 165 are directed by microlenses 175 in a first (default) direction. Microlens assembly 170 also includes one or more force generators 177 that selectively move microlens support 172 out of the neutral position relative to emitter array 160, thereby causing each microlens 175 to direct its corresponding light beam (light signal) in a direction determined by the position of that microlens relative to its associated emitter 165. A combination including a suitable emitter array 160 and micro-machined microlens assembly 170 is described in additional detail in co-owned U.S. Pat. No. 6,091,537 "Electro-actuated Microlens Assemblies", which is incorporated herein in its entirety.

Referring to the right side of FIG. 2, receiver array 180 includes a series of receivers (e.g., photodetectors) 185 that are arranged in a pattern (e.g., a straight line) such that each receiver 185 is capable of receiving a corresponding light signal 157 generated by a corresponding emitter 165 and directed by a corresponding microlens 175. As described below, receivers 185 must be capable of distinguishing strong signals (i.e., indicating a light beam centered on the receiver) versus a relatively weak light signal (i.e., indicating a light beam that is not centered on the receiver).

Receivers and associated measurement circuitry providing this function are well-known.

Referring briefly to FIG. 1, in one embodiment, first slot 112 and second slot 114 are arranged such that rough positioning is provided between emitter array 160 and receiver array 180. However, as depicted in FIG. 3(A) and described above, this rough positioning typically does not provide optimal alignment of each emitter 165 with its corresponding receiver 185. Further, as discussed above, one of the key issues with free-space optical interconnects is that the relative positions of the boards (subsystems) that support emitter 165 and receiver 185 are likely to be time varying. Without the presence of microlens assembly 170, special alignment tools would be required to align each emitter 165 and receiver 185, as depicted in FIG. 3(B), which is tedious and expensive.

FIG. 4 is a simplified perspective view illustrating a method by which an emitter 165 and its associated receiver 185 are automatically aligned according to the present invention. FIG. 4 includes a controller 400, which represents portions of one or more of system CPU 110, first subsystem 120, or second subsystem 130. That is, the process of determining the optimal alignment of microlens assembly 170 may be performed by circuitry and software provided in any of system CPU 110, first subsystem 120, or second subsystem 130.

Referring to the left side of FIG. 4, during a first portion of the alignment process, microlens assembly 170 is manipulated by controller 400 such that each microlens 175 is moved according to a predefined series of positions relative to an associated emitter 165 such that light signals generated by emitter 165 are transmitted over a wide area surrounding receiver 185. As discussed above, movement of microlens 175 is performed by causing force generator 177 to apply forces to move microlens support 172 against the bias of suspension members 174 (see FIG. 2). By moving microlens support 172 in this manner through a predefined series of positions corresponding to sequentially arranged horizontal rows, a series of light beams are rastered over a large area in which receiver 165 is located. For example, a first light beam 157-A, which is generated by positioning microlens support 172 in a first position relative to emitter 165, is directed to a predefined point 410-A. Subsequent horizontal movements of microlens support 172 produces a corresponding series of light beams directed in a horizontal pattern (shown in FIG. 4). At the end of a horizontal row, microlens support 172 is shifted vertically to generate light beams in a second horizontal row located below the first row. This process is repeated until a last light beam 157-B passes through a point 410-B located at the end of a last (lowermost) row. Note that the depicted pattern is exemplary only, and that an actual pattern may cover a much wider area and include many more light points. Further, the horizontal raster pattern is not intended to be limiting in that many patterns may be suitably utilized to form points (light beams) over a wide area including receiver 185.

During the generation of light beams 157-A through 157-B, receiver 185 measures the light intensity of each light beam to determine the optimal opposition of microlens 175. In particular, as each light beam is generated, receiver measures the amount of detected light, and generates a corresponding signal indicated the light strength to controller 400. A strongest light beam 157-S is measured when it strikes a point 410-S that coincides with receiver 185. The optimal position of microlens 175 is thus determined by identifying the position of microlens support 172 at the time strongest light beam 157-S is generated. In embodiments where each microlens 175 is positioned independently (e.g., as suggested in FIG. 4), this positioning process is then repeated for all of the microlenses of the array. In embodiments where two or more microlenses are mounted on a common support (as shown in FIG. 2, the "strongest light beam" may be determined by averaging each measured light beam. Note that all receivers of the receiver array must receive a light signal having a strength that is greater than a minimum threshold for that receiver.

Finally, upon completing the rastering process, force generator 177 is controlled to lock microlens 175 into the optimal position (i.e., such that it repeatedly generates light beam 157-S). As mentioned above, controller 400 determines this optimal position by matching the position of microlens support 172 with strongest light beam 157-S. This position is then passed from controller 400 to force generator 177 such that all subsequent light beams generated from emitter 165 are directed by microlens 175 to point 410-S.

FIG. 5 is a flow diagram showing the process of automatically aligning emitter array 160 with receiver array 180 using microlens assembly 170 according to a specific embodiment of the present invention. FIG. 5 is separated into three columns associated with system CPU 110, first subsystem 120 (i.e., tasks performed by emitter array 160 and microlens assembly 170), and second subsystem 130 (i.e., tasks performed by receiver array 180). Note that, as suggested above with reference to FIG. 4, some or all of the tasks performed by system CPU 110 may be performed locally by either subsystem.

Referring to the upper portion of FIG. 5, system CPU 110 leaves a standby condition and initiates the automatic alignment process upon receiving a power-on/reset control signal from either subsystem (yes in reset decision block 501). This power-on/reset control signal indicates that both subsystems are now connected into the system (e.g., inserted in slot 112 or 114) and functioning properly. For example, a hot-swap procedure may be performed during which first subsystem 120 is inserted into slot 112 (FIG. 1). After performing a power up procedure, first subsystem 120 transmits a power-up/reset control signal to system CPU 110 via conductor 111 (FIG. 1) indicating that the system is ready for operation.

Referring to the center column of FIG. 5, when a reset control signal is detected, system CPU 110 resets (clears) a stored microlens assembly lock position setting, which is used to identify the optimal microlens position (block 503), and then transmits a start command to first subsystem 120 and second subsystem 130.

Referring to the left side of FIG. 5, upon receiving the start command (yes in decision block 507), first subsystem 120 causes force generator 177 to reset microlens support 172 (both shown in FIG. 1) to an initial position X=0, Y=0 (block 510). This initial position is then used to generate an initial light beam (block 515) similar to that of light beam 157-A (see FIG. 4, discussed above). Note that upon generating the initial light beam, the position coordinates X=0, Y=0 of microlens support 172 are transmitted to system CPU 110.

Referring to the right side of FIG. 5, upon receiving the start command (yes in decision block 509), the receivers are reset and/or otherwise prepared to measure light beams received from the emitter (block 520). Each time a light beam is transmitted from first subsystem 120, the receivers measure the amount of incident light, and transmit the measurement to system CPU 110 (block 525).

Referring to the center of FIG. 5, system CPU 110 receives and matches the position coordinates (e.g., X=0, Y=0) of the microlens support from first subsystem 120, and the corresponding receiver measurement from second subsystem 130 (block 535), and then compares the receiver measurement with the strongest stored measurement (block 537). If the current receiver measurement is stronger than the stored measurement, then the current position coordinates (e.g., X=0, Y=0) are stored as the position associated with the strongest light beam (block 539).

This microlens positioning, light beam generation, and light beam measurement process is repeated until measurements are compared for every predefined positions of the microlens support. Referring to the left side of FIG. 5, after transmitting each light beam, the position of the microlens support is incrementally changed (e.g., X=1, Y=0) (block 540), and a light beam is transmitted with the microlens in the changed position (block 515). This process is repeated until a light beam has been transmitted from every microlens support position (yes in decision block 545). Note that each measured light beam is compared with the previously established strongest light beam, and the microlens position associated with the stronger of the two light beams is retained (block 539).

After the strength of the last light beam has been compared with the stored strongest light beam (yes in decision block 550), system CPU 110 locks the microlens support into the optimal position by passing the strongest light beam position Xs,Ys to first subsystem 120 (block 560). In particular, position Xs,Ys is utilized by force generator 177 (see FIG. 1) to move microlens support 172 into the optimal position (bock 570). Microlens support 172 remains locked in the optimal position until system CPU 110 issues a new reset command.

The optimal positioning process illustrated in FIG. 5 is described with reference to the replacement of first subsystem 120 or second subsystem 130. It is also recognized that the same process may be performed, for example, when the system CPU 110 determines that the position of one or both subsystems have shifted, for example, due to vibrations applied to the system. Note again that the positioning process is typically performed for both subsystems (i.e., to facilitate two-way communication).

Further, the process of identifying an optimal position may be modified to stop when an optimal light beam strength is achieved. For example, at each position of a microlens positioning sequence the measured light beam strength may be compared with a predetermined acceptable value, and the process may be terminated when a position is found in which the light beam strength is greater than or equal to the predetermined acceptable strength. This alternative process would reduce the amount of time required to located an optimal microlens position when compared with the rastering process of the disclosed embodiment, described above.

Figure 6:
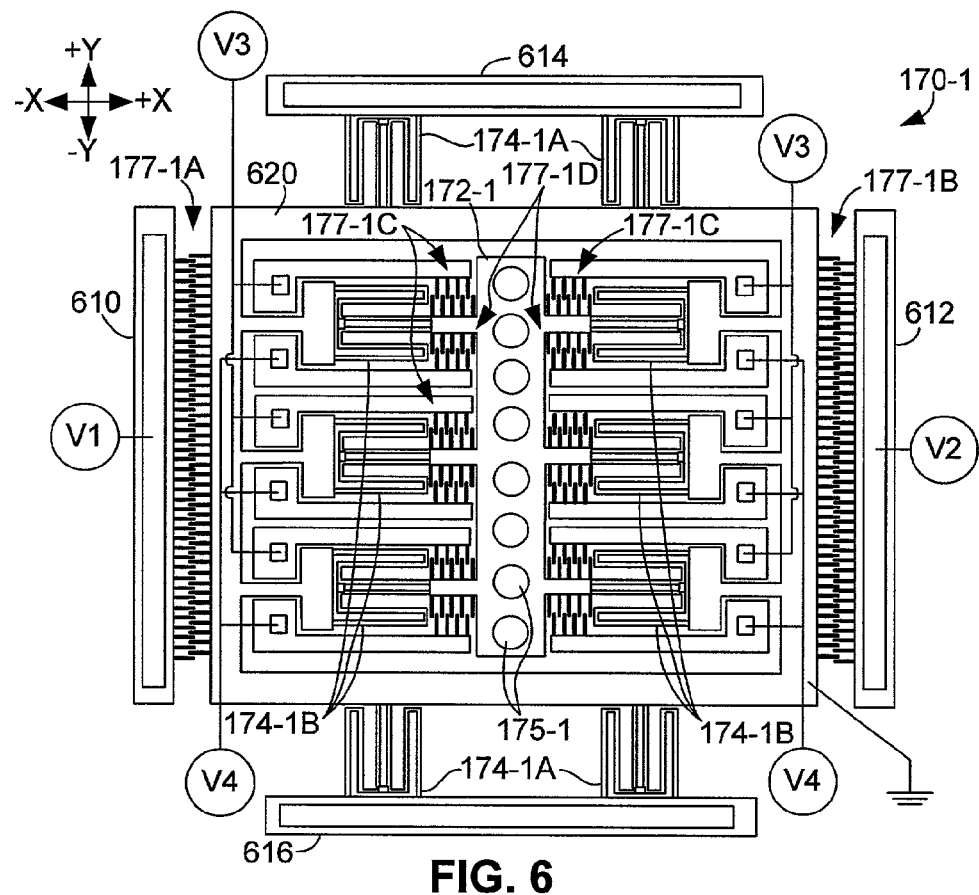
FIG. 6 is a plan view showing a four-way microlens assembly according to an embodiment of the present invention.
Figure 7:
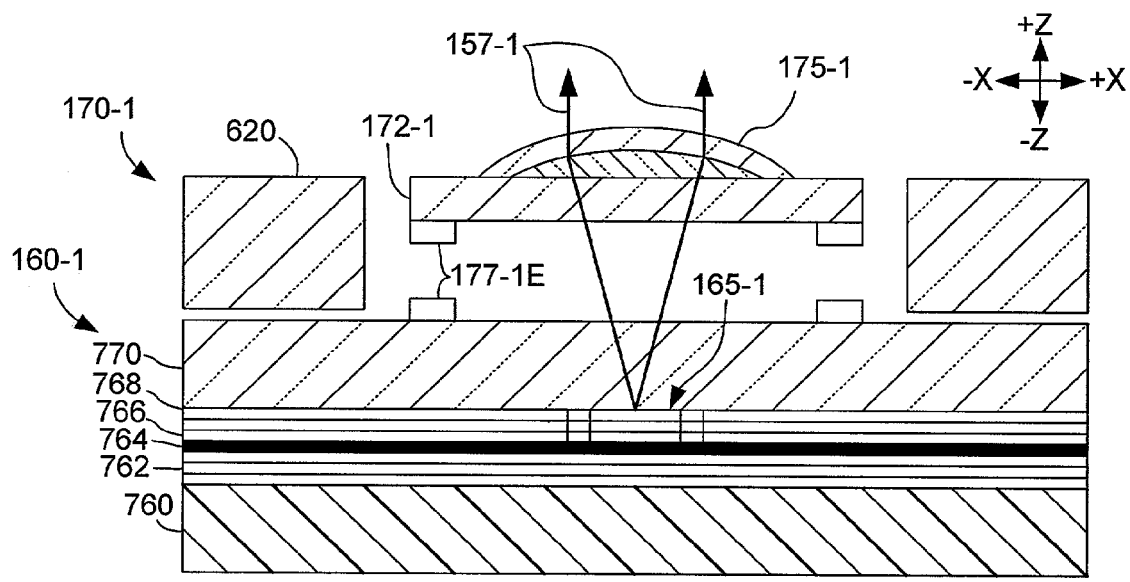
FIG. 7 is a simplified cross-sectional side view of the microlens assembly shown in FIG. 6.

FIGS. 6 and 7 are top plan and simplified cross-sectional side views showing a four-way micro-machined microlens assembly 170-1 according to an embodiment of the present invention. Four-way microlens assembly 170-1 is similar to the two-way microlens assembly described in co-owned U.S. Pat. No. 6,091,537, cited above, but is provided with additional force structures that facilitate four-way operation.

Referring to FIG. 6, microlens assembly 170-1 includes a fixed outer frame formed by members 610, 612, 614, and 616, and a movable inner frame 620 that is connected to members 614 and 616 of the fixed outer frame by a set of first suspension members (springs) 174-1A. First springs 174-1A facilitate movement of inner frame 620 relative to the fixed outer frame in a first orthogonal direction (e.g., −X and +X). Similarly, a microlens support 172-1 is mounted to inner frame 620 by a set of second suspension members (springs) 174-1B, which facilitate movement of support 172-1 relative to inner frame 620 in a second orthogonal direction (e.g. −Y and +Y). Springs 174-1A and 174-1B may take the form of folded bending springs (as shown), and may also include other configurations known from the silicon art, for example, straight beams.

A series of microlenses 175-1 are fixedly mounted on support 172-1, and are mounted over an associated series of fixed light emitters, which are described below with reference to FIG. 7. Movement of microlenses 175-1 in the first (X) and second (Y) orthogonal directions is facilitated with electrostatic comb drives 177-1A, 177-1B, 177-1C, and 177-1D. First comb drive 177-1A includes a first set of combs mounted on fixed frame member 610 and an associated set of combs mounted on inner frame 620. Second comb drive 177-1B includes a second set of combs mounted on fixed frame member 612 and an associated set of combs mounted on inner frame 620. Movement of inner frame 620 (and, hence, microlenses 175-1) in the −X direction is generated by applying a first voltage V1 to the comb set connected to member 610 (the associated comb set mounted on inner frame 620 is connected to ground), thereby pulling inner frame 620 in the −X direction against the bias of springs 174-1A. Similarly, movement of inner frame 620 in the +X direction is generated by applying a second voltage V2 to the comb set connected to member 612 (assuming a counter force is not generated by comb drive 177-1A), thereby pulling inner frame 620 in the +X direction against the bias of springs 174-1A. Third comb drive 177-1C includes sets of combs mounted on inner frame 620 and associated sets of combs mounted on microlens support 172-1. Fourth comb drive 177-1D includes sets of combs mounted on inner frame 620 and associated sets of combs mounted on microlens support 172-1. Movement of microlens support 172-1 (and, hence, microlenses 175-1) in the +Y direction is generated by applying a third voltage V3 to the comb sets connected of comb drive 177-1C (the associated comb sets mounted on microlens support 172-1 are connected to ground), thereby pulling microlens support 172-1 in the −X direction against the bias of springs 174-1B. Similarly, movement of microlens support 172-1 in the −Y direction is generated by applying a fourth voltage V4 to the comb sets of comb drive 177-1D. In alternative embodiments, the electrostatic comb drives described above may be replaced with any actuation system as is well known in the microelectromechanical systems (MEMS) art.

FIG. 7 is a simplified cross-sectional view showing one microlens 175-1 positioned over a corresponding fixed light emitter 165-1 of emitter array 160-1. Fixed light emitters 165-1 may take the form of any light source, for example, vertical cavity surface emitting lasers (VCSELS), light emitting diodes (LEDS), and edge emitting lasers. Moving microlens 175-1 laterally (e.g., in the +X or −X directions) relative to VCSEL emitter 165-1 bends (directs) the light beam and sweeps the far field spot of the light beam. A fifth force generating motor 177-1E may be formed in accordance with known methods to facilitate movement of microlens support 172-1 in a third orthogonal direction (−Z and +Z), thereby facilitating collimation of the light beam 157-1 passed through microlens 175-1.

In accordance with the disclosed embodiment, VCSEL emitter 165-1 includes layers of a III-V substrate 760, N quarter wave distributed Bragg reflector (DBR) mirror layers 762, active region 764, P DBR mirror 766 and P+contact layer 768. VCSEL emitter 165-1 structure may be formed using well-known processes. A spacer layer 770 is formed between the VCSEL structure and microlens support 172-1. Spacer layer 770 may be polyimide, which is coated on the VCSEL surface by conventional coating techniques, for example, spin coated. Spacer layer 770 should be insulative and light transmitting. The function of spacer layer 770 is to adjust the distance between microlens 175-1 and VCSEL emitter 165-1. The thickness of spacer layer 770 varies depending on the focal point of microlens 175-1 and the thickness of substrate 760. In one embodiment, microlens support 172-1 and frame 620 is fabricated from a (SOI) (Si/SiO$_2$/Si) wafer.

Although the present invention has been described with respect to certain specific embodiments, the inventive features of the present invention are applicable to other embodiments as well. For example, more than one microlens assembly may be utilized to direct light beams to corresponding receivers, as suggested in the alternative embodiments described below with reference to FIGS. 8 and 9. Further, the number and arrangement of microlenses on each microlens support may range from a single microlens per individually-positioned microlens support (as suggested in FIG. 4) to multiple microlenses arranged in an array, as indicated in the alternative embodiment described below with reference to FIG. 10. Further, the light source used to produce the light beams need not be limited to emitters. For example, as described below with reference to FIGS. 11 and 12, a bundle of optical fibers may be utilized to provide the light beams directed by the microlens assembly. In yet another possible embodiment, one or more light modifying elements may be placed in the light path between the microlens assembly and the receiver array. For example, as described below with reference to FIG. 13, a fixed (stationary) lens array may be placed between the microlens array and the receiver.

Figures 8, 9:
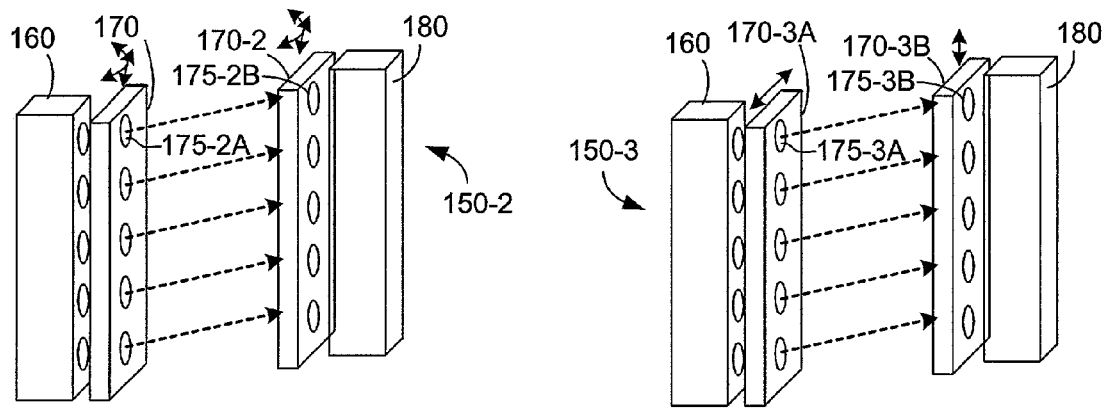
FIG. 8 is a perspective view depicting a simplified communication apparatus according to an alternative embodiment of the present invention.
FIG. 9 is a perspective view depicting a simplified communication apparatus according to another alternative embodiment of the present invention.

FIG. 8 is a simplified perspective view showing a free space optical interconnect apparatus 150-2 according to an alternative embodiment of the present invention. Similar to the embodiments described above, interconnect apparatus 150-2 includes an emitter array 160, a four-way microlens assembly 170 mounted in front of emitter array 160, and a receiver array 180. However, interconnect apparatus 150-2 also includes a second four-way microlens assembly 170-2 mounted adjacent to receiver array 180 to provide further alignment of the emitted light beams into receiver array 180. Second four-way microlens assembly 170-2 is constructed and operates in a manner similar to that of microlens array 170, described above.

FIG. 9 is a simplified perspective view showing a free space optical interconnect apparatus 150-3 according to another alternative embodiment of the present invention. Similar to the embodiments described above, interconnect apparatus 150-3 includes an emitter array 160 and a receiver array 180. However, microlens assembly 150-3 includes a first two-way microlens assembly 170-3A mounted adjacent to emitter array 160, and a second two-way microlens assembly 170-3B mounted adjacent to receiver array 180. First microlens assembly 170-3A is controlled to operate only in the horizontal (first) direction relative to emitter array 160 and receiver array 180, and second microlens assembly is controlled to operate only in the vertical (second) direction relative to emitter array 160 and receiver array 180.

Figures 10, 11, 13:
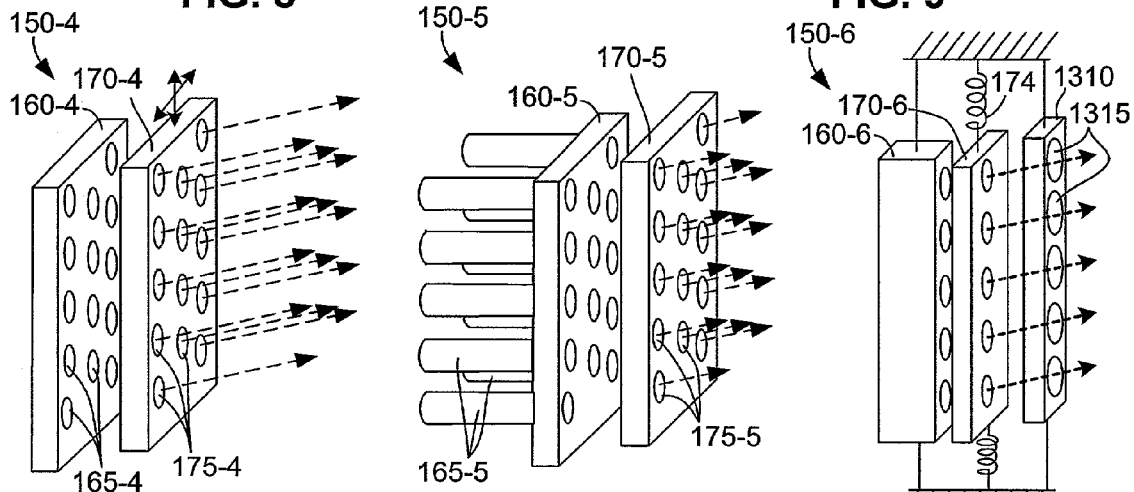
FIG. 10 is a perspective view depicting a simplified communication apparatus according to yet another alternative embodiment of the present invention.
FIG. 11 is a perspective view depicting a simplified communication apparatus according to yet another alternative embodiment of the present invention.
FIG. 13 is a perspective view depicting a simplified communication apparatus according to yet another alternative embodiment of the present invention.

FIG. 10 is a simplified perspective view showing a portion of a free space optical interconnect apparatus 150-4 according to yet another alternative embodiment of the present invention. Instead of a single row of emitters and associated microlenses, interconnect apparatus 150-4 includes an emitter array 160-4 and matching microlens assembly 170-4 in which emitters 165-4 and microlenses 175-4 are arranged in a matrix pattern (i.e., several rows) such that each microlens 175-4 is positioned to receive light signals emitted from an associated emitter 165-4. A corresponding receiver array (not shown) includes receivers arranged in the same matrix pattern as that of emitters 165-4 and microlenses 175-4.

FIG. 11 is a simplified perspective view showing a portion of a free space optical interconnect apparatus 150-5 according to yet another alternative embodiment of the present invention. Instead of emitters, interconnect apparatus 150-5 includes a light source structure 160-5 including fiber optic elements 165-5 arranged in matrix and directed toward a microlens assembly 170-5 having microlenses 175-5 are arranged in the same matrix pattern.

Figure 12:
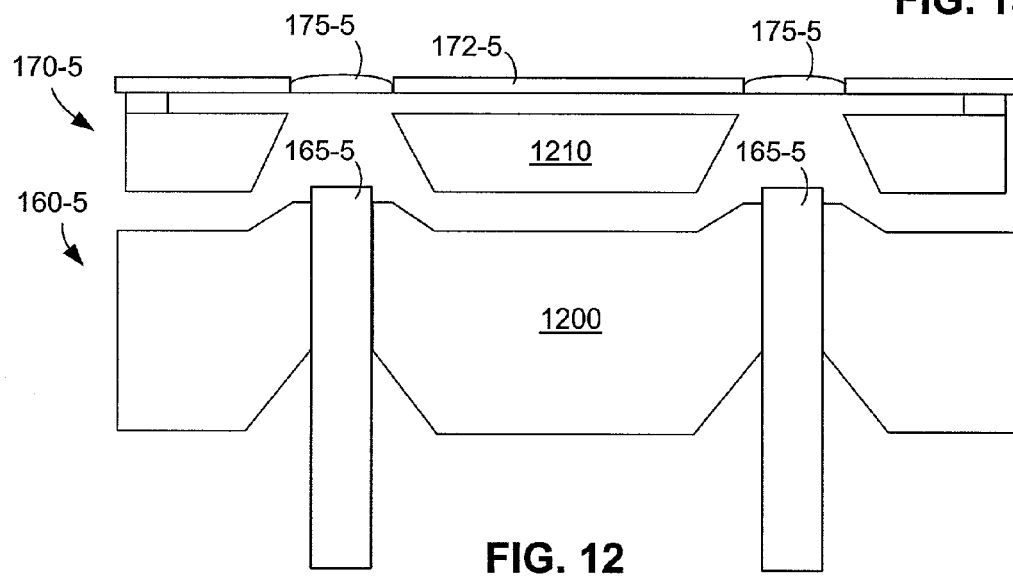
FIG. 12 is a cross-sectional side view showing a portion of the communication apparatus shown in FIG. 11.

FIG. 12 is a cross-sectional side view showing a portion of interconnect apparatus 150-5. Light source structure 160-5 includes a fiber carrier 1200 for maintaining ends of optical fibers 165-5 in position, and a base portion 1210 of microlens assembly 170-5 is mounted over fiber carrier 1200. As in previous embodiments, microlenses 175-5 are mounted on a support 172-5 that is movable relative to optical fibers 165-5.

FIG. 13 is a simplified perspective view showing a portion of a free space optical interconnect apparatus 150-6 according to yet another alternative embodiment of the present invention. Interconnect apparatus 150-6 includes a light source structure 160-6 (e.g., emitters) 165-6 and a microlens assembly 170-6 similar to that described above, and also includes a light modifying structure 1310 located between microlens assembly 170-6 and a receiver array (not shown). In the disclosed exemplary embodiment, light modifying structure 1310 comprises a stationary array of lenses 1315 that further facilitate beam direction.

Figure 14:
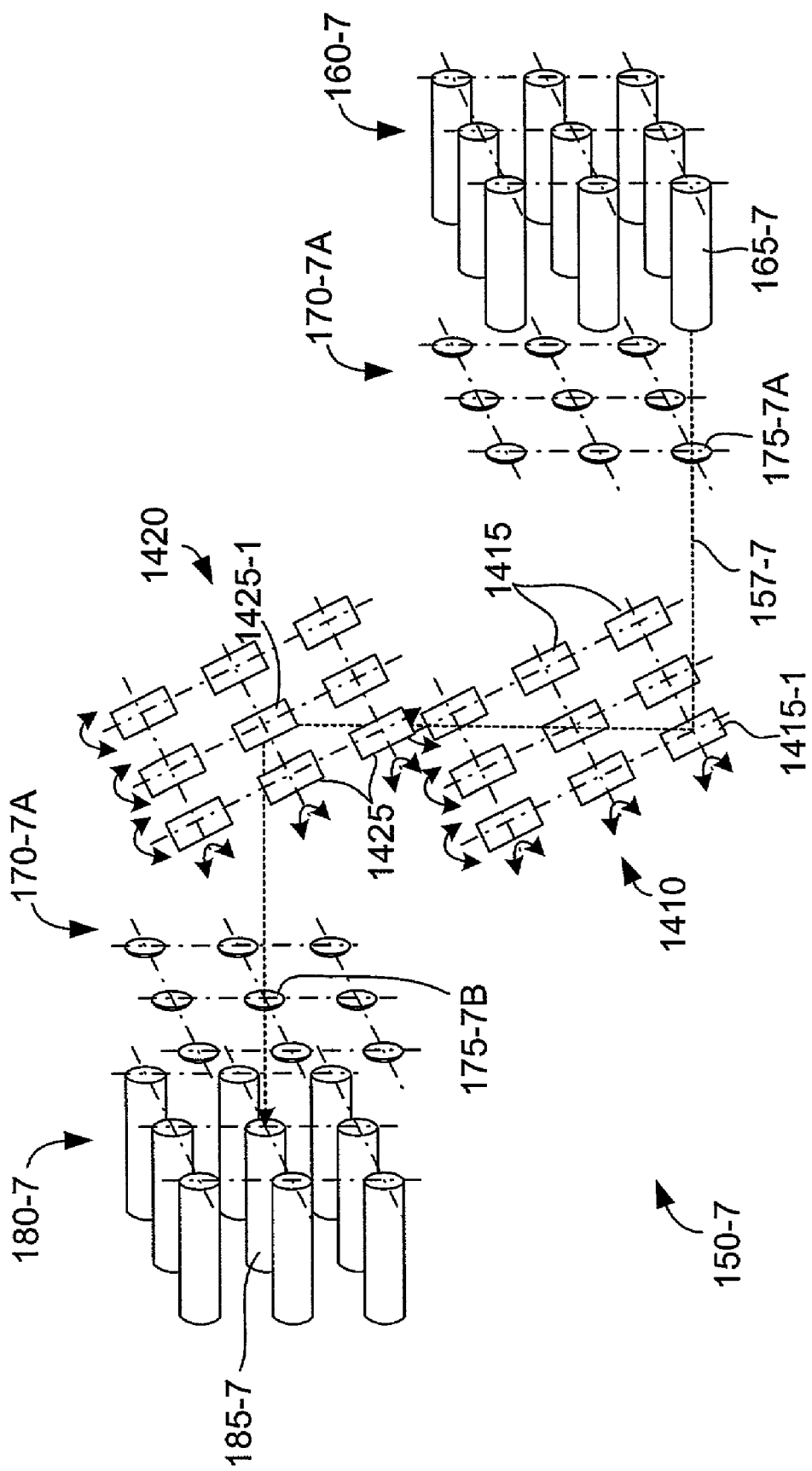
FIG. 14 is a perspective view depicting a simplified communication switching apparatus according to yet another alternative embodiment of the present invention.

FIG. 14 is a simplified perspective view showing a portion of a free space optical interconnect switching apparatus 150-7 according to yet another alternative embodiment of the present invention. Interconnect switching apparatus 150-7 includes a light source (e.g., fiber optic element) array 160-7, a first microlens assembly 170-7A, a second microlens assembly 170-7B, and a receiver array (180-7). First microlens assembly 170-7A and second microlens assembly 170-7B operate in a manner similar to that described above. Interconnect switching apparatus 150-7 also includes a first light modifying (switching) structure 1410 and a second light modifying (switching) structure 1420 that are located in the light path between microlens assembly 170-7A and microlens assembly 170b. In the disclosed exemplary embodiment, each light modifying structure 1410 comprises a movable array of mirrors 1415 and 1425 that pivot around respective horizontal and vertical axes to facilitate the steering of a light beam from a selected emitter to a selected receiver. For example, light beam 157-7 emitted by an emitter 165-7 is passed through microlens 165-7 to a first mirror 1415-A of first modifying structure 1410. Mirror 1415-A is positioned by a force generator (not shown) in accordance to methods similar to those described herein to direct light beam 157-7 to a mirror 1425-A of second modifying structure 1420. Similarly, mirror 1425-A is positioned by a force generator (not shown) in accordance to methods similar to those described herein to direct light beam 157-7 to a microlens 175-7B, which directs light beam 157-7 into selected receiver 185-7 of receiver array 180-7. Accordingly, a light beam generated by any of the emitters of emitter array 160-7 is selectively directed to any receiver of receiver array 180-7 by selectively positioning the mirrors of first light modifying structure 1410 and second light modifying structure 1420.

In addition to the exemplary embodiments described above, it will be clear to those skilled in the art that the inventive features of the present invention are applicable to other embodiments as well, all of which are intended to fall within the scope of the present invention. For example, in addition to the disclosed electrostatic comb drives, suitable force generators may be produced using other known technologies, such as thermal (bimorph type or differential bending) force generators, piezoelectric force generators, and electromagnetic force generators.

The invention claimed is:

1. A free space optical interconnect apparatus for conveying data from a first subsystem to a second subsystem within a main system, the main system including a system processing unit that is connected by first conductors to the first subsystem and by second conductors to the second subsystem, the apparatus comprising:
    a light source connected to the first subsystem such that the light source generates light signals in response to first data values provided by the first subsystem;
    a micro-machined microlens assembly including a microlens array, a microlens support upon which the microlens array is mounted, at least one suspension member connected to the microlens support such that the microlens array is movably suspended over the light source, and at least one force generator for moving the microlens support relative to the light source, thereby causing the microlens array to direct the light signals generated by the light source in a direction determined by a position of the microlens array relative to the light source; and
    a receiver connected to the second subsystem for detecting the light signals generated by the light source, and for generating second data values from the detected light signals that are provided to the second subsystem;
    wherein the system processing unit includes control means for controlling the force generator of the microlens assembly such that the microlens array is automatically positioned to direct the light signals from the light source to the receiver, wherein said control means includes:
    means for transmitting first control signals to the force generator of the first subsystem via the first conductors such that the microlens array is moved according to a predefined series of positions relative to the light source, whereby each light signal generated by the light source is directed by a corresponding microlens of the microlens array over a wide area surrounding the receiver,
    means for identifying an optimal position of the microlens array using second control signals received from the second subsystem via the second conductors, the optimal position of the microlens array being associated with an optimal strength of said light signals received by the receiver, and
    means for transmitting third control signals to the force generator of the first subsystem such that the microlens array is locked into a position associated with the optimal strength of said light signals.

2. The free space optical interconnect system according to claim 1, wherein the light source comprises an emitter array including a plurality of emitters, and wherein the microlens array includes a plurality of microlenses that are fixedly mounted on the microlens support such that each microlens is positioned in front of a corresponding emitter of the emitter array.

3. The free space optical interconnect system according to claim 2, wherein the plurality of emitters and the plurality of microlenses are arranged in lines such that each microlens is positioned to receive light signals emitted from an associated emitter.

4. The free space optical interconnect system according to claim 2, wherein the plurality of emitters and the plurality of microlenses are arranged in matrix patterns such that each microlens is positioned to receive light signals emitted from an associated emitter.

5. The free space optical interconnect system according to claim 1, wherein the microlens assembly is movable in a first direction and a second direction relative to the light source.

6. The free space optical interconnect system according to claim 5,
    wherein the microlens assembly further comprises an outer frame and an inner frame connected to the outer frame by a first suspension member,
    wherein said microlens support is movably connected to the inner frame by a second suspension member, and
    wherein the force generator comprises a first comb drive for positioning the inner frame relative to the outer frame in the first direction, and a second comb drive for positioning the outer frame relative to a fixed base in the second direction.

7. The free space optical interconnect system according to claim 1,
    wherein the microlens assembly is movable in both a first direction and a second direction that is perpendicular to the first direction,
    wherein a second microlens assembly is mounted between the first lens assembly and the receiver, and
    wherein the second lens assembly is movable in both the first direction and the second direction relative to the receiver.

8. The free space optical interconnect system according to claim 1,
    wherein the microlens assembly is movable only in a first direction,
    wherein a second microlens assembly is mounted between the first microlens assembly and the receiver, and
    wherein the second microlens assembly is movable only in a second direction relative to the emitter, the second direction being perpendicular to the first direction.

9. The free space optical interconnect system according to claim 1, wherein the light source comprises an optical fiber.

10. The free space optical interconnect system according to claim 1, further comprising a modifying member located between the microlens and the receiver.

11. The free space optical interconnect system according to claim 10, wherein the modifying member is a stationary lens.

12. The free space optical interconnect system according to claim 10, wherein the modifying member is a mirror.

13. A method for automatically aligning a plurality of emitters and a plurality of receivers across a free space separating the emitters and receivers in order to convey data from a first subsystem to a second subsystem within a server system,
    wherein the server system includes a system processing unit that is connected by first conductors to the first subsystem and by second conductors to the second subsystem, wherein the plurality of emitters are mounted on the first subsystem such that the emitters generate light beams in response to first data values provided by the first subsystem, wherein the plurality of receivers are mounted on the second subsystem such that the receivers detect the light beams generated by the plurality of emitters, and generate second data values from the detected light beams that are provided to the second subsystem, the method comprising:

transmitting first control signals from the system processing unit to the first subsystem via the first conductors, wherein the first control signals cause the first subsystem to move a microlens array located between the emitters and receivers according to a predefined series of positions relative to the emitters such that light beams generated by each of the emitters are directed by a corresponding microlens of the microlens array over a wide area surrounding the receivers, determining an optimal position of the microlens array by causing the receivers to measure a strength of each light beam, and by identifying an optimal strength light beam, and transmitting third control signals to the first subsystem such that the the microlens array is locked into a position associated with the optimal strength light beam.

14. The method according to claim 13, wherein the microlens array is mounted on a support that is movably connected to a base by a resilient suspension member, and wherein moving the microlens array comprises causing a force generator to apply a force on the support against the bias of the resilient suspension member.

15. The method according to claim 13, wherein moving the microlens array comprises rastering the light beams over the wide area.

16. The method according to claim 13, wherein identifying the optimal position comprises comparing each measured light beam strength with a previously stored strongest light beam strength, and replacing position coordinates associated with the previously stored strongest light beam with position coordinates associated with the measured light beam if the measured light beam strength is greater than the stored strongest light beam strength.

17. The method according to claim 16, wherein locking the microlens array comprises positioning the microlens array support using position coordinates of the stored strongest light beam after the microlens array has been moved through the predefined series of positions.

* * * * *